United States Patent [19]

Dworczak et al.

[11] Patent Number: 4,746,715

[45] Date of Patent: May 24, 1988

[54] PROCESS FOR THE PRODUCTION OF HYDROXYTELECHELIC POLYMERS AND THEIR USE AS COMPONENTS OF POLYURETHANE ELASTOMERS

[75] Inventors: Renate Dworczak; Bernd Trathnigg; Hans Junek, all of Graz; Andreas Schmidt, Hainburg, all of Austria

[73] Assignee: Lim Kunststoff-Technologie Gesellschaft m.b.H., Kittsee, Austria

[21] Appl. No.: 840,285

[22] Filed: Mar. 14, 1986

[30] Foreign Application Priority Data

Mar. 15, 1985 [AT] Austria .................................. 770/85

[51] Int. Cl.$^4$ ............................................. C08G 18/38
[52] U.S. Cl. ..................................... 526/211; 528/75; 528/85
[58] Field of Search ..................... 526/211; 528/75, 85

[56] References Cited

U.S. PATENT DOCUMENTS

| | | | |
|---|---|---|---|
| 3,886,190 | 5/1975 | Reed | 526/219 |
| 4,272,435 | 6/1981 | Matsuda et al. | 260/192 |
| 4,290,945 | 9/1981 | Syrov et al. | 260/192 |

FOREIGN PATENT DOCUMENTS

| | | |
|---|---|---|
| 1544864 | 5/1970 | Fed. Rep. of Germany . |
| 2124000 | 11/1972 | Fed. Rep. of Germany . |
| 2302579 | 8/1973 | Fed. Rep. of Germany . |
| 2518622 | 11/1976 | Fed. Rep. of Germany . |
| 2170546 | 5/1973 | France . |
| 964259 | 7/1964 | United Kingdom . |

*Primary Examiner*—Maurice J. Welsh
*Attorney, Agent, or Firm*—Panitch, Schwarze, Jacobs and Nadel

[57] ABSTRACT

The invention relates to a process for the production of polyurethanes, in particular of polyurethane elastomers under use of diols and diisocyanates as well as optionally chain extenders, comprising the improvement of using diols or optionally chain extenders having at least one terminal group of the formula

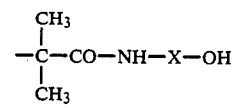

wherein X is a straight or branched alkylene group with 2 to 12 C-atoms. The diols or chain extenders are mainly polymers or oligomers of ethylenically unsaturated monomers and preferably have a hydroxyl functionality in the proximity of 2, preferably of 1,9 to 2,1.

The invention further relates to a process for the radical polymerization, comprising the improvement of polymerizing ethylenically unsaturated monomers in the presence of azo-bis-N,N'-isobutyric acid hydroxyalkyl amides of the general formula

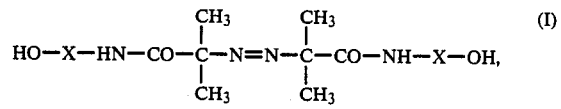

wherein X is a straight or branched alkylene group with 2 to 12 C-atoms.

7 Claims, No Drawings

PROCESS FOR THE PRODUCTION OF HYDROXYTELECHELIC POLYMERS AND THEIR USE AS COMPONENTS OF POLYURETHANE ELASTOMERS

The present invention relates to the use of an azo initiator in the form of an azo-bis-N,N'-isobutyric acid derivative in processes for the radical polymerization of ethylenically unsaturated monomers as well as the use of the polymerisates thus obtained as components of polyurethanes, in particular of polyurethane elastomers.

It is basically known that it is possible to obtain polymers or oligomers with functional end groups on both sides, the so-called telechelic polymers or oligomers, by radical polymerizaton of ethylenically unsaturated monomers, if the monomers are polymerized with initiators (activators) affording said end groups. These polymers or oligomers are of great importance, e.g., for the production of polyurethanes.

In this regard, it was already stated that among the initiators of this type, next to those containing carboxylic groups, above all those containing hydroxyl groups are technically interesting. (H. Schnecko, G. Degler, H. Dongowsky, R. Caspary, G. Angerer, T. S. Ng, Angew. Makromol. Chem. 70, 9 (1978); R. D. Athey, Jr., Progr. Org. Coat. 7, 289 (1979)).

Azo compounds containing hydroxyl groups and used as such initiators have the formula

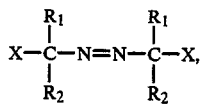

wherein X in each case is an electron-attracting group (e.g. CN or COOH), and the hydroxyl groups are contained in $R_1$ or $R_2$ or linked with X, and are described by S. F. Reed, J. Polym. Sci., Part A-1, 2, 2029(1971); N. D. Ghatge, S. P. Vernekar, P. P. Wadgaonkar, J. Polym. Sci., Polym. Chem. Ed. 21, 3591 (1983); B. B. Idage, as well as by S. P. Vernekar and N. D. Ghatge, ibid. 21, 385 (1983).

U.S. Pat. No. 4,272,435 describes similar symmetrical azo initiators of the formula

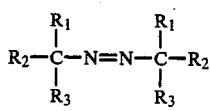

wherein $R_1$ and $R_2$ in each case are $C_1-C_8$ alkyl groups, $C_3-C_8$ alicyclic hydrocarbon groups, $C_6-C_{10}$ aromatic hydrocarbon groups or $C_4-C_{12}$ alicyclic hydrocarbon groups, optionally substituted by carboxyl, hydroxyl or alkoxy groups, the alicycles being formed by linkage of $R_1$ and $R_2$ with the adjacent C-atom. $R_3$ in each case stands for nitrilo groups, $C_1-C_4$ alkanoester groups, alkaline or alkaline earth carboxylate groups or carboxylamino groups.

Azo initiators in the form of azo-bis-N,N'-isobutyric acid dialkyl esters are described in U.S. Pat. No. 4,290,945 and DE-OS No. 21 24 000. For their preparation, the azo-bis-N,N'-isobutyric acid nitrile known as the technically important azo initiator Porofor N is reacted with monoalcohols (U.S. Patent) or alkane diols (DE-OS), so that the esters according to DE-OS No. 21 24 000 have terminal hydroxyl groups.

Azo initiators having terminal —SH— groups are described in DE-OS No. 25 18 622. These azo initiators have the general formula

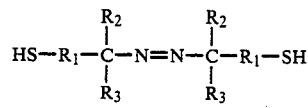

wherein $R_1$ in each case stands for bifunctional organic radicals and $R_2$ and $R_3$ in each case represent the same or different organic radicals which are optionally linked to form a ring.

According to DE-OS No. 25 18 622, these mercapto compounds can e.g. be obtained by esterification of azo-bis-N,N'-hydroxyalkyl amides with mercapto carboxylic acids. Concerning the starting materials, it is stated that azo-bis-N,N'-isobutyric acid hydroxyalkyl amides are easily accessible by aminolysis of the known azo-bis-N,N'-isobutyric acid methyl or ethyl ester with amino alcohols.

It was now found that azo-bis-N,N'-isobutyric acid hydroxyalkyl amides of the general formula

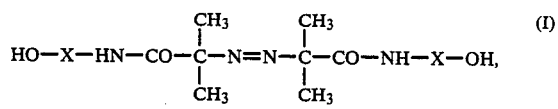

wherein X represents a straight or branched alkylene group having from 2 to 12 C-atoms are particularly well suited as azo initiators for the polymerization of usual ethylenically unsaturated monomers.

Surprisingly, this yields hydroxytelechelic polymers or oligomers of high uniformity and regularity and having a hydroxyl functionality within the range of 2 (generally from 1,9 to 2,1) which are excellent starting materials for the production of polyurethanes, in particular of polyurethane elastomers.

Usually employed ethylenically unsaturated monomers are, e.g., 1,3-butadiene, isoprene and chloroprene, and a homo- or copolymerization can be carried out. Suitable comonomers are a.o. styrene or its derivatives, such as methyl styrene, and acrylic derivatives, e.g. acrylonitrile.

The elastomers obtained via the hydroxytelechelic polymers or oligomers of the ethylenically unsaturated monomers have high cold flexibility and high hydrolysis stability not obtainable by means of the initiators used up to now, in particular those affording ester groups. Moreover, these elastomers can advantageously be highly filled, e.g. with carbon black or $SiO_2$, and excellent physical properties can be obtained even without chain extenders.

The radical polymerization of the ethylenically unsaturated monomers with the azo-bis-N,N'-isobutyric acid hydroxyalkyl amides of the formula I is carried out in the usual manner, just as the further processing of the hydroxytelechelic polymers or oligomers thus formed together with (di) isocyanates and optionally chain extenders. The chain extenders are also conventional substances; MOCA(4,4'-methylene-bis-(2-chloroaniline)) is mentioned as an example for a chain extender containing amino groups.

The compounds of the formula I used as initiators according to the invention can be obtained in a known manner by aminolysis of azo-bis-N,N'-isobutyric acid alkylesters with aminoalkanols. These alkylesters with straight or branched alkyl groups are easily obtainable compounds (J. Thiele, K. Heuser, Liebigs Ann. Chem. 290, 1 (1896)) and are reacted with straight or branched alkanols having up to 6C-atoms.

Advantageously, the azo-bis-N,N'-isobutyric acid-lower alkyl esters, preferably the methyl or ethyl esters, are reacted with the amino alcohols at temperatures of from 0° to 60° C. in a solvent which can be excess amino alcohol or a polar organic solvent, preferably a straight or branched alcohol having 1 to 6C-atoms, in the presence or in the absence of a basic catalyst, preferably with an alkaline or alkaline earth metal amide or an alkaline or alkaline earth alcoholate or of a lower aliphatic alcohol. The alcohols can be introduced into the reaction as such or prepared in situ by dissolving the metal or a metal hydride in the alcohol. Depending on the reaction temperature, the reaction times for the aminolysis range between 1 and 72 hours, and preferably are about 6 hours.

The invention is explained in detail in the following by means of preparation examples for the azo initiators and working examples.

PREPARATION EXAMPLE 1

2.4 g (39.2 mmol) of 2-amino ethanol and 5.0 g (19.36 mmol) azo-bis-isobutyric acid diethyl ester are added to a solution of 0.1 g (4.3 mmol) sodium in 10 ml methanol. The reaction mixture is stirred for 20 hours at 25° C., the precipitate is sucked off, washed with a small amount of petroleum ether (bp. 40°-60° C.) and dried in vacuo.

Yield: 5.0 g, by the further addition of 2-amino ethanol to the mother liquor, a nearly quantitative yield can be obtained after extended reaction times.

The crude product is obtained in sufficient purity to be employed directly as an initiator. For analytical purposes, careful recrystallization from methanol can be carried out (nitrogen cleavage sets in at 80° C.).

$C_{12}H_{24}N_4O_4$ (288.3) calc.: C 49.90, H 8.39, N 19.43, found: C 49.88, H 8.41, N 19.37.

IR (in KBr, cm$^{-1}$): 3390, 3330 (NH-Valency), 3010, 2990, 2940, 2880 (CH-Valency) 1660, 1530

$^1$H-NMR (CDCl$_3$, δ, ppm): 1.31 (s. 12H, CH$_3$); 3.29 (m. 8H, CH$_2$—); 4.17 (s, 2H, .OH); 7.44 (BROAD, 2H, —NH).

PREPARATION EXAMPLE 2

0.99 g lithium amide (0.43 mmol) are dissolved in 10 ml 2-amino ethanol, then 5.o g (21.7 mmol) azo-bis-isobutyric acid dimethyl ester are added and the solution is stirred for 56 hours at 30° C. The precipitate is sucked off, washed with a small amount of petroleum ether and dried in vacuo. Yield: 3.2 g (51% of theory).

WORKING EXAMPLE 1

3.o g (10.4 mmol) azo-bis-isobutyric acid-di-2-hydroxyethyl amide (V) in 1o ml methanol and 10.0 g (189.9 mmol) butadiene-1,3 are heated in a closed vessel for 24 hours to 70° C. After cooling, 30 ml methanol are added and the precipitated hydroxy-terminated polybutadiene is isolated.

The following molecular weights were determined by means of gel chromatography:
$M_W = 4173$
$M_n = 3382$
$M_w/M_n = 1,23$ A mean functionality of
$F = 2,05$
was determined by means of $^1$H-NMR-spectroscopy.

WORKING EXAMPLE 2

In a reaction vessel of 5 l volume provided with an agitator, 750 g (13.87 mol) butadiene, 250 g (2.11 mol) vinyl toluene and 150 g (0.52 mol) azo-bis-isobutyric acid-di-2-hydroxyethyl amide are stirred in 1 kg methanol for 24 hours at 85° C. After cooling, the precipitated polymer is isolated, stirred at room temperature for 30 minutes with 1 kg methanol and dried after separation in vacuo at 40° C. The product thus obtained (700 g) has a molacular weight (determined by means of GPC) of
$M_w = 8219$, and,
$M_n = 3480$
and a degree of irregularity of
$M_w/M_n = 2.361$

WORKING EXAMPLE 3

According to the procedure of working example 2, a charge of 750 g (13.87 mol) butadiene, 250 g (2.40 mol) styrene and 50 g (0.17 mol) azo-bis-isobutyric acid-dihydroxyethyl amide is processed in 1 kg methanol. The product thus obtained (194 g) has a molecular weight of
$M_w = 9594$
$M_n = 3876$
and a degree of irregularity of
$M_w/M_n = 2.475$

WORKING EXAMPLE 4

According to the procedure described in working example 2, a charge of 750 g (13.87 mol) butadiene, 250 g (4.71 mol) acrylonitrile, 100 g (0.34 mol) azo-bis-isobutyric acid-di-hydroxyethyl amide is processed in 1 kg methanol. Reaction time: 24 hours. The product thus obtained has a molecular weight (determined by means of GPC) of
$M_w = 8410$, and,
$M_n = 4339$
and a degree of irregularity of
$M_w/M_n = 1.938$

WORKING EXAMPLE 5

Working example 4 is repeated, with 120 hours reaction time. The product thus obtained has a molecular weight (determined by means of GPC) of
$M_w = 15008$ and
$M_n = 5529$
and a degree of irregularity of
$M_w/M_n = 2.714$

WORKING EXAMPLE 6

According to the procedure of working example 2, a charge of 565 g (9.72 mol) butadiene, 225 g (2.25 mol) ethyl acrylate and 60 g (0.21 mol) azo-bis-isobutyric acid-di-hydroxyethyl amide is processed in 1 kg ethanol. Reaction time: 40 hours. The product thus obtained has a molecular weight (determined by means of GPC) of
$M_w = 5810$, and,
$M_n = 3361$
and a degree of irregularity of
$M_w/M_n = 1.729$

WORKING EXAMPLE 7

2087 g (0.5 mol) of hydroxy-terminated polybutadiene prepared according to working example 1 is kneaded in a kneader at a temperature of about 50° C. with 1544 g carbon black of the type ISAF at first for 30 minutes at normal pressure and then for 4 hours in a vacuum of <10 mm Hg. After this time, the carbon black was sufficiently dispersed. The vacuum is the relieved by means of nitrogen, the mixture is cooled to 30° C., then 95.8 g (0.55 mol) 2,4-toluylene diisocyanate are added and admixed in vacuo at 30° C. for 2o minutes. The viscous paste thus obtained is processed, as described in GB-PS No. 1437007, into the tread portion of a cast tire of the dimension 165 SR 13.

WORKING EXAMPLE 8

2087 g (o.5 mol) hydroxy-terminated polybutadiene obtained according to working example 1 are stirred in vacuo at 100° C. for 1 hour, then cooled to 80° C., then after relieving the vacuum with nitrogen, 261.2 g (1.5 mol) 2,4-toluylene diisocyanate are added. The mixture is stirred under exclusion of moisture for 2 hours at 80° C. and evacuated, the vacuum is relieved with nitrogen and a small amount (about 2 g) are used for determining the isocyanate content. The prepolymer thus obtained has an isocyanate content of about 3.55%. This prepolymer can be cross-linked with various aromatic diamines used in polyurethane production for the preparation of the final elastomer.

WORKING EXAMPLE 9

100 g of the prepolymer obtained according to working example 8 are intimately mixed with 10.7 g (0.04 mol) of melted 4,4'-methylene-bis-(2-chloroaniline) and poured into a plate mold at 100° C. The elastomeric mixture is kept at 100° C. for 5 hours. The result is a polyurethane elastomer which due to the special composition of its soft segment is particularly hydrolysis-stable and of outstanding cold flexibility. For this reason, it is particularly well suited as carcass material for cast polyurethane tires as described in GB-PS No. 1437007.

WORKING EXAMPLE 10

33.8 g (0.01 mol) hydroxy-terminated polybutadiene produced according to working example 1 are mixed with 3.48 g (0.014 mol) Baytec ®1604[1]) and degassed in vacuo for 2 hours at 70° C. The vacuum is then relieved with nitrogen and cooling is effected under nitrogen to about 40° C. Then, 4.8 g (0.0276 mol) 2,4-toluylene diisocyanate are stirred in quickly and thoroughly.

[1])Baytec ®1604=3,5-diamino-4-chloro-benzoic acid-isobutyl ester

The reaction mixture thus obtained is immediately poured onto metal molds preheated to 100° C., the molds are closed and placed into a hot cabinet at 100° C. for 3 hours for curing the material.

The sample plates thus obtained are cooled and then stored for 24 hours at room temperature prior to subjecting them to appropriate physical tests.

The tests yield the following results:

| | | |
|---|---|---|
| Hardness (DIN 53505) | | 86 Shore A |
| Tensile stress (DIN 53504) | 3% | 0,89 N/mm² |
| | 5% | 1,13 N/mm² |
| | 7% | 1,32 N/mm² |
| | 10% | 1,55 N/mm² |
| | 100% | 4,43 N/mm² |
| | 300% | 9,26 N/mm² |
| Tensile strength (DIN 53504) | | 18,46 N/mm² |
| Elongation at rupture (DIN 53504) | 532% | |
| Resistance to tear propagation (tear strength) (DIN 53515) | 23° C. | 31 kN/m |
| | 70° C. | 23 kN/m |
| Abrasion (DIN 53516) | | 48 mm³ |

We claim:

1. A process for the production of polyurethanes using a diol and a diisocyanate, comprising the improvement of using a diol with at least one terminal group of the formula:

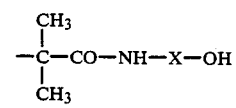

wherein X is a straight or branched alkylene group with 2 to 12 carbon atoms.

2. The process according to claim 1, wherein the polyurethane is a polyurethane elastomer.

3. The process according to claim 1, wherein the production of polyurethanes further comprises the use of a chain extender.

4. The process according to claim 1, wherein the diol is selected from the group consisting of oligomers and polymers of ethylenically unsaturated monomers.

5. The process according to claim 1, wherein the diol has a hydroxyl functionality in the range of 1.9 to 2.1.

6. The process according to claim 1, wherein the diol is the radical polymerization product of polymerizing an ethylenically unsaturated monomer in the presence of an azo-bis-N,N'-isobutyric acid hydroxylalkyl admide of the formula:

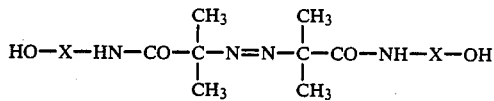

wherein X is a straight or branched alkylene group with 2 to 12 carbon atoms.

7. A process for producing a diol by radical polymerization comprising polymerizing an ethylenically unsaturated monomer in the presence of an azo-bis-N,N'-isobutyric acid hydroxyalkyl amide of the formula:

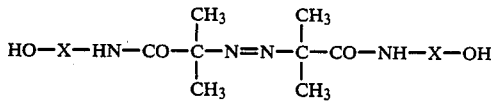

wherein X is a straight or branched alkylene group with 2 to 12 carbon atoms.

* * * * *